US011663722B2

(12) United States Patent
Jha et al.

(10) Patent No.: US 11,663,722 B2
(45) Date of Patent: May 30, 2023

(54) INTERACTIVE TRAINING OF A MACHINE LEARNING MODEL FOR TISSUE SEGMENTATION

(71) Applicant: Applied Materials, Inc., Santa Clara, CA (US)

(72) Inventors: Sumit Kumar Jha, Jharkhand (IN); Aditya Sista, Bangalore (IN); Ganesh Kumar Mohanur Raghunathan, Bangalore (IN); Ubhay Kumar, Bihar (IN); Kedar Sapre, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/729,377

(22) Filed: Apr. 26, 2022

(65) Prior Publication Data

US 2022/0261992 A1    Aug. 18, 2022

Related U.S. Application Data

(63) Continuation of application No. 17/028,747, filed on Sep. 22, 2020, now Pat. No. 11,321,839.

(Continued)

(51) Int. Cl.
*G06K 9/00*    (2022.01)
*G06T 7/00*    (2017.01)
(Continued)

(52) U.S. Cl.
CPC ............ *G06T 7/0012* (2013.01); *G06F 18/22* (2023.01); *G06F 18/24323* (2023.01);
(Continued)

(58) Field of Classification Search
None
See application file for complete search history.

(56) References Cited

U.S. PATENT DOCUMENTS

| 7,139,415 B2 | 11/2006 | Finkbeiner |
| 7,826,977 B2 | 11/2010 | Garty et al. |

(Continued)

FOREIGN PATENT DOCUMENTS

| JP | H06-004601 | 1/1994 |
| TW | 201503001 | 1/2015 |

(Continued)

OTHER PUBLICATIONS

Chen et al., "Deeplab: semantic image segmentation with deep convolutional nets, atrous convolution, and fully connected CRFs," IEEE Transactions on Pattern Analysis and Machine Intelligence, Apr. 2018, 40(4):834-848.

(Continued)

*Primary Examiner* — Soo Jin Park
(74) *Attorney, Agent, or Firm* — Fish & Richardson P.C.

(57) ABSTRACT

Methods, systems, and apparatus, including computer programs encoded on a computer storage medium, for training a machine learning model to segment magnified images of tissue samples. The method includes obtaining a magnified image of a tissue sample; processing an input comprising: the image, features derived from the image, or both, in accordance with current values of model parameters of a machine learning model to generate an automatic segmentation of the image into a plurality of tissue classes; providing, to a user through a user interface, an indication of: (i) the image, and (ii) the automatic segmentation of the image; determining an edited segmentation of the image, comprising applying modifications specified by the user to the automatic segmentation of the image; and determining updated values of the model parameters of the machine learning model based the edited segmentation of the image.

20 Claims, 4 Drawing Sheets

SEGMENTATION SYSTEM 100

Related U.S. Application Data (60) Provisional application No. 62/905,232, filed on Sep. 24, 2019.

(51) Int. Cl.
*G06T 7/11* (2017.01)
*G06V 10/25* (2022.01)
*G06F 18/22* (2023.01)
*G06F 18/243* (2023.01)

(52) U.S. Cl.
CPC ............... *G06T 7/11* (2017.01); *G06V 10/25* (2022.01); *G06T 2207/10056* (2013.01); *G06T 2207/20084* (2013.01); *G06T 2207/30024* (2013.01)

(56) References Cited

U.S. PATENT DOCUMENTS

| | | | |
|---|---|---|---|
| 9,029,159 | B2 | 5/2015 | Furrer et al. |
| 9,494,521 | B2 | 11/2016 | Holmes et al. |
| 9,600,762 | B2 | 3/2017 | Sarah et al. |
| 9,959,499 | B2 | 5/2018 | Julian et al. |
| 11,321,839 | B2 | 5/2022 | Jha et al. |
| 11,462,308 | B2* | 10/2022 | Lyman ................ G06K 9/6254 |
| 2010/0322489 | A1 | 12/2010 | Tizhoosh et al. |
| 2014/0358825 | A1 | 12/2014 | Phillipps et al. |
| 2018/0031817 | A1 | 2/2018 | Barral |
| 2018/0232883 | A1 | 8/2018 | Sethi et al. |
| 2019/0005304 | A1 | 1/2019 | Adalsteinsson et al. |
| 2019/0188849 | A1 | 6/2019 | Reicher et al. |
| 2019/0209116 | A1 | 7/2019 | Sjostrand et al. |
| 2020/0097701 | A1* | 3/2020 | Chukka ................ G06V 10/82 |
| 2021/0090251 | A1 | 3/2021 | Jha et al. |
| 2021/0264595 | A1* | 8/2021 | Plesch ................ G01N 21/6428 |
| 2022/0156926 | A1* | 5/2022 | Raharja ................ A61B 90/20 |

FOREIGN PATENT DOCUMENTS

| | | |
|---|---|---|
| TW | 201523463 | 6/2015 |
| TW | 201832181 | 9/2018 |
| TW | 202026959 | 7/2020 |
| WO | WO 2003/105675 | 12/2003 |
| WO | WO 2018/231204 | 12/2018 |
| WO | WO 2019/084697 | 5/2019 |

OTHER PUBLICATIONS

International Search Report and Written Opinion in International Appln. No. PCT/US2020/051944, dated Dec. 30, 2020, 10 pages.

Liu et al., "Microfluidic device as a new platform for immunofluorescent detection of viruses," Lab on a Chip, 2005, 5(11):1327-1330.

Lutnick et al., "An integrated iterative annotation technique for easing neural network training in medical image analysis", Nature Machine Intelligence, Feb. 2019, 1:112-119.

McGarry et al., "Ragio-pathomic of epithelium and lumen density predict the location of high-grade prostate cancer", International Journal of Radiation Oncology*Biology*Physics, Aug. 2018, 101(5):1179-1187.

Nalisnik et al., "Interactive phenotyping of largescale histology imaging data with HistomicsML," Scientific Reports, Nov. 2017, 7:14588.

Office Action in Taiwanese Appln. No. 109132717, dated Oct. 8, 2021, 9 pages (with English Search Report).

Office Action in Indian Appln. No. 202247023018, dated Sep. 1, 2022, 6 pages.

* cited by examiner

INTERACTIVE TRAINING OF A MACHINE LEARNING MODEL FOR TISSUE SEGMENTATION

CROSS-REFERENCE TO RELATED APPLICATIONS

This application is a continuation application and claims priority to U.S. patent application Ser. No. 17/028,747, filed on Sep. 22, 2020, which claims priority to U.S. Provisional Application Ser. No. 62/905,232, filed on Sep. 24, 2019, the disclosures of which are incorporated by reference.

BACKGROUND

This specification relates to processing magnified images of tissue samples using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations for segmenting magnified images of tissue samples into respective tissue classes.

According to a first aspect there is provided a method performed by one or more data processing apparatus for training a machine learning model to segment magnified images of tissue samples. The method includes repeatedly performing operations including obtaining a magnified image of a tissue sample. An input including: the image, features derived from the image, or both, is processed in accordance with current values of model parameters of a machine learning model to generate an automatic segmentation of the image into a set of tissue classes, where the automatic segmentation specifies a respective tissue class corresponding to each pixel of the image. An indication of: (i) the image, and (ii) the automatic segmentation of the image, is provided to a user through a user interface. An input specifying one or more modifications to the automatic segmentation of the image is obtained from the user through the user interface. An edited segmentation of the image is determined, including applying the modifications specified by the user to the automatic segmentation of the image. Updated values of the model parameters of the machine learning model are determined based the edited segmentation of the image.

In some implementations, the set of tissue classes include cancerous tissue and non-cancerous tissue.

In some implementations, the image is a whole slide image (WSI) captured using a microscope.

In some implementations, the machine learning model includes a neural network model.

In some implementations, the neural network model is a convolutional neural network model including one or more convolutional neural network layers.

In some implementations, providing, to the user through the user interface, an indication of: (i) the image, and (ii) the automatic segmentation of the image includes providing, to the user through the user interface, a visualization that depicts the automatic segmentation overlaid on the image.

In some implementations, the visualization that depicts the automatic segmentation overlaid on the image indicates the respective tissue class corresponding to each pixel of the image.

In some implementations, each modification to the automatic segmentation of the image indicates, for one or more pixels of the image, a change to the respective tissue class specified for the pixel by the automatic segmentation. Applying the modifications specified by the user to the automatic segmentation of the image includes changing the tissue classes corresponding to one or more pixels of the image in accordance with the modifications specified by the user.

In some implementations, determining updated values of the model parameters based on the edited segmentation of the image includes: determining gradients of an objective function that characterizes a similarity between: (i) the automatic segmentation of the image, and (ii) the edited segmentation of the image; and adjusting the values of the model parameters using the gradients.

In some implementations, the method further includes determining an expertise score that characterizes a predicted skill of the user in reviewing and editing tissue segmentations.

According to another aspect, there is provided a system including: one or more computers; and one or more storage devices communicatively coupled to the one or more computers, where the one or more storage devices store instructions that, when executed by the one or more computers, cause the one or more computers to perform the operations of the method of the first aspect.

According to a third aspect, there are provided one or more non-transitory computer storage media storing instructions that when executed by one or more computers cause the one or more computers to perform the operations of the method of the first aspect.

Particular embodiments of the subject matter described in this specification can be implemented so as to realize one or more of the following advantages. The segmentation system described in this specification enables a user (e.g., a pathologist) to work in tandem with a machine learning model to segment magnified images of tissue samples into (target) tissue classes in a manner that is both time-efficient and highly accurate. This specification describes techniques for computing an "expertise" score for a user that characterizes the predicted skill of the user in manually reviewing and editing segmentations (i.e., of the target tissue classes). The expertise scores can be used to improve the performance of the segmentation system. For example, the expertise scores can be used to improve the quality of the training data used to train the segmentation system, e.g., by determining whether to include a segmentation generated by a user in the training data based on the expertise score of the user.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a segmentation system for segmenting magnified images of tissue samples (e.g., that are generated using a microscope, e.g., an optical microscope) into respective tissue classes. More specifically, the segmentation system can process a magnified image of a tissue sample to identify a respective (target) tissue class corresponding to each pixel of the image. The (target) tissue class of a pixel in the image characterizes the type of tissue in the portion of the tissue sample corresponding to the pixel.

As used throughout this document, a "microscope" can refer to any system that can generate magnified images of a sample, e.g., using a 1-D array of photodetectors, or using a 2-D array of charge-coupled devices (CCDs).

The segmentation system can be configured to segment images into any appropriate set of tissue classes. In one example, the segmentation system may segment images into cancerous tissue and non-cancerous tissue. In another example, the segmentation system may segment images into: healthy tissue, cancerous tissue, and necrotic tissue. In another example, the segmentation system may segment images into: muscle tissue, nervous tissue, connective tissue, epithelial tissue, and "other" tissue. The segmentation system can be used in any of a variety of settings, e.g., to segment magnified images of tissue samples that are obtained from patients through biopsy procedures. The tissue samples can be samples of any appropriate sort of tissue, e.g., prostate tissue, breast tissue, liver tissue, or kidney tissue. The segmentations generated by the segmentation system can be used for any of a variety of purposes, e.g., to characterize the presence or extent of disease (e.g., cancer).

Manually segmenting a single magnified image of a tissue sample may be a challenging task that consumes hours of time, e.g., as a result of the high-dimensionality of the image, which can have on the order of $10^{10}$ pixels. On the other hand, a machine learning model can be trained to automatically segment magnified images of tissue samples in considerably less time (e.g., in seconds or minutes, e.g., 10-30 minutes). However, it may be difficult to train a machine learning model to achieve a level of accuracy that would be considered acceptable for certain practical applications, e.g., identifying cancerous tissue in biopsy samples. In particular, the microscopic appearance of tissue can be highly complex and variable due to factors that are both intrinsic to the tissue (e.g., the type and stage of the disease present in tissue) and extrinsic to the tissue (e.g., how the microscope is calibrated and the procedure used to stain the tissue). This makes it hard to aggregate a set of labeled training data (i.e., for training a machine learning model) that is sufficiently large to capture the full scope of possible variations in the microscopic appearance of tissue.

The segmentation system described in this specification enables a user (e.g., a pathologist) to work in tandem with a machine learning model to segment tissue samples in a manner that is both time-efficient and highly accurate. To segment an image, the machine learning model first generates an automatic segmentation of the image which is subsequently provided to the user through a user interface that enables the user to review and manually edit the automatic segmentation as necessary. The "edited" segmentation is provided by the segmentation system as an output, and is also used to update the parameter values of the machine learning model (e.g., immediately or at a subsequent time point) to cause it to generate segmentations that more closely match those of the user.

In this manner, rather than being trained once on a static and limited set of training data (as in some conventional systems), the machine learning model continually learns and adapts its parameter values based on the feedback being provided by the user through the edited segmentations. Moreover, rather than being required to segment an image from scratch, the user can start from the automatic segmentation generated by the machine learning model, and may be required to make fewer corrections to the automatic segmentations over time as the machine learning model continually improves.

The term "tissue" here refers to a group of cells of similar structure and function, as opposed to individual cells. The color, texturing, and similar image properties of tissues are significantly different from those of individual cells, so image processing techniques applicable to cell classification often are not applicable to segmenting images of tissue samples and classifying those segments.

These features and other features are described in more detail below.

Figure 1:
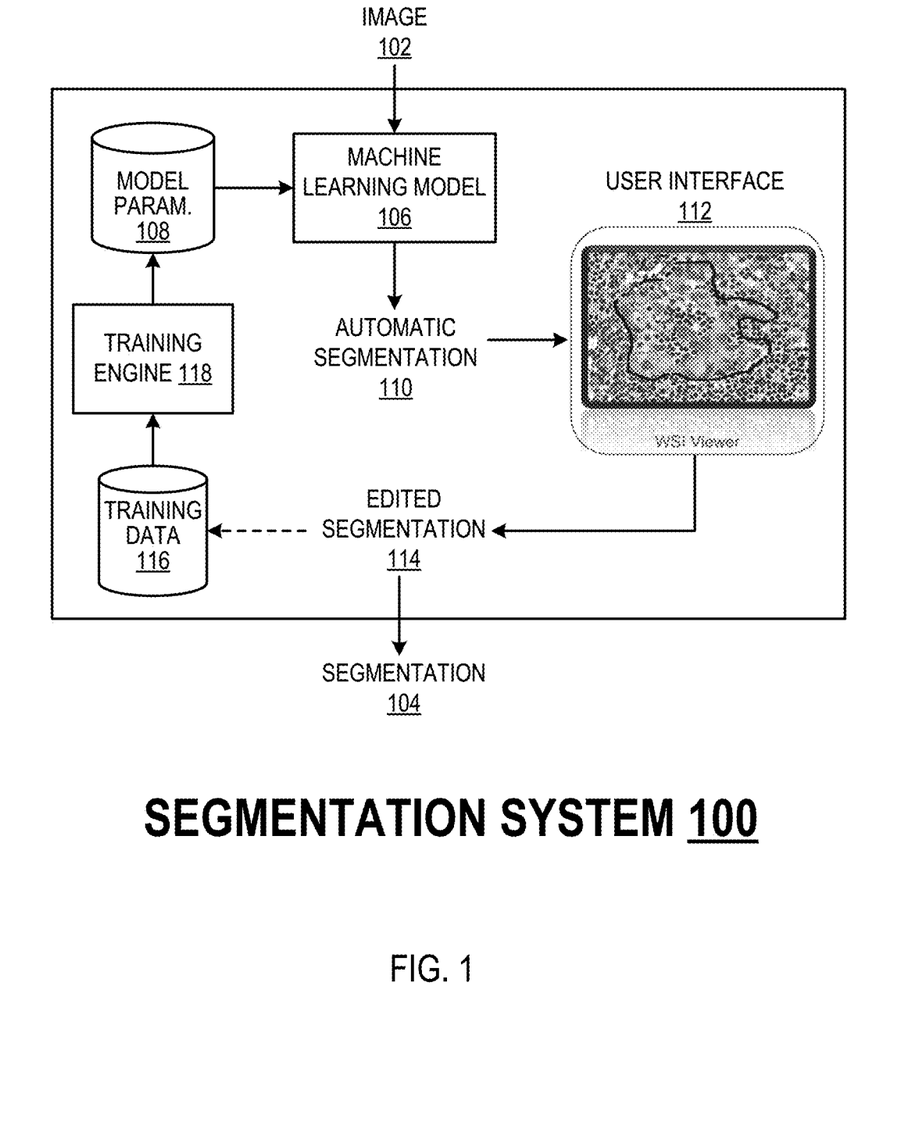
FIG. 1 shows an example segmentation system.

FIG. 1 shows an example segmentation system 100. The segmentation system 100 is an example of a system implemented as computer programs on one or more computers in one or more locations in which the systems, components, and techniques described below are implemented.

The segmentation system 100 is configured to process a magnified image 102 of a tissue sample to generate a segmentation 104 of the image 102 into respective tissue classes, e.g., cancerous and non-cancerous tissue classes.

The image 102 may be, e.g., a whole slide image (WSI) of a tissue sample mounted on a microscope slide, where the WSI is generated using an optical microscope and captured using a digital camera. The image 102 can be represented in any of a variety of ways, e.g., as a two-dimensional (2-D) array of pixels, where each pixel is associated with a vector of numerical values characterizing the appearance of the pixel, e.g., a 3-D vector defining the red-green-blue (RGB) color of the pixel. The array of pixels representing the image 102 may have a dimensionality on the order of, e.g., $10^5 \times 10^5$ pixels, and may occupy several gigabytes (GB) of memory. The system 100 may receive the image 102 in any of a variety of ways, e.g., as an upload from a user of the system using a user interface made available by the system 100.

The machine learning model 106 is configured to process the image 102, features derived from the image 102, or both, in accordance with current values of a set of model parameters 108 to generate an automatic segmentation 110 of the image 102 that specifies a respective tissue class corresponding to each pixel of the image 102. The machine learning model 106 may be, e.g., a neural network model, a random forest model, a support vector machine model, or a linear model. In one example, the machine learning model may be a convolutional neural network having an input layer that receives the image 102, a set of convolutional layers that process the image to generate alternative representations of the image at progressively higher levels of abstraction, and a soft-max output layer. In another example, the machine learning model may be a random forest model that is configured to process a respective feature representation of each pixel of the image 102 to generate an output that specifies a tissue class for the pixel. In this example, a feature representation of a pixel refers to an ordered collection of numerical values (e.g., a vector of numerical values) that characterizes the appearance of the pixel. The feature representation may be generated using, e.g., histogram of oriented gradient (HOG) features, speeded up robust features (SURF), or scale-invariant feature transform (SIFT) features.

The model parameters 108 are a collection of numerical values that are learned during training of the machine learning model 106 and which specify the operations performed by the machine learning model 106 to generate an automatic segmentation 110 of the image 102. For example, if the machine learning model 106 is a neural network, the model parameters 108 may specify the weight values of each layer of the neural network, e.g., the weight values of the convolutional filters of each convolutional layer of the neural network. (The weight values for a given layer of the neural network may refer to the values associated with the connections between neurons of the given layer and neurons in the preceding layer of the neural network). As another example, if the machine learning model 106 is a random forest model, the model parameters 108 may specify the parameter values of the respective splitting function used at each node of each decision tree of the random forest. As another example, if the machine learning model 106 is a linear model, the model parameters 108 may specify the coefficients of the linear model.

The system 100 displays the image 102 and the automatic segmentation 110 of the image on a display device of a user interface 112. For example, the system 100 may display a visualization that depicts the automatic segmentation 110 overlaid onto the image 102, as illustrated with reference to FIG. 2. The user interface 112 may have any appropriate sort of display device, e.g., a liquid-crystal display (LCD).

The user interface 112 enables a user of the system (e.g., a pathologist) to view the image 102 and the automatic segmentation 110, and to edit the automatic segmentation 110 as necessary by specifying one or more modifications to the automatic segmentation 110. Modifying the automatic segmentation 110 refers to changing the tissue class specified by the automatic segmentation 110 to a different tissue class for one or more pixels of the image 102. Generally, the user may edit the automatic segmentation 110 to correct any errors in the automatic segmentation 110. For example, the user interface 112 may enable the user to "deselect" a region of the image that is specified by the automatic segmentation as having a certain tissue class (e.g., cancerous tissue) by re-labeling the region as having a default tissue class (e.g., non-cancerous tissue). As another example, the user interface 112 may enable the user to "select" a region of the image and label the region as having a particular tissue class (e.g., cancerous tissue). As another example, the user interface 112 may enable the user to change the region of the image labelled as having a particular tissue class. The change in a region can be performed, e.g., by dragging corners of a polygon surrounding the region.

The user may interact with the user interface 112 to edit the automatic segmentation 110 in any of a variety of ways, e.g., using a computer mouse, a touch screen, or both. For example, to select a region of the image and label the region as having a tissue class, the user may use a cursor to draw a closed loop around the region of the image, and then select the desired tissue class from a drop down menu. The user may indicate that editing of the automatic segmentation is complete by providing an appropriate input to the user interface (e.g., clicking a "Finish" button), at which point the edited segmentation 114 (i.e., that has been reviewed and potentially modified by the user) is provided as an output. For example, the output segmentation 104 may be stored in a medical records data store in association with a patient identifier.

In addition to providing the edited segmentation 114 as an output, the system 100 may also use the edited segmentation 114 to generate a training example that specifies: (i) the image, and (ii) the edited segmentation 114, and store the training example in a set of training data 116. Generally, the training data 116 stores multiple training examples (i.e., that each specify a respective image and an edited segmentation), and may be continually augmented over time as users generate edited segmentations of new images. The system 100 uses a training engine 118 to repeatedly train the machine learning model 106 on the training data 116 by updating the model parameters 108 to encourage the machine learning model 106 to generate automatic segmentations that match the edited segmentations specified by the training data 116.

The training engine 118 may train the machine learning model 106 on the training data 116 whenever a training criterion is satisfied. For example, the training engine 118 may train the machine learning model 106 each time a predefined number of new training examples are added to the training data 116. As another example, the training engine 118 may train the machine learning model 106 each time the machine learning model 106 generates an automatic segmentation 110 that differs substantially from the corresponding edited segmentation 114 that is specified by the user. In this example, the training engine 118 may use the substantial difference between the automatic segmentation 110 and the edited segmentation 114 as a cue that the machine learning model 106 failed to correctly segment an image and should be trained to avoid repeating the errors. The training engine 118 may determine that two segmentations are substantially different if a similarity measure between the segmentations (e.g., a Jaccard index similarity measure) does not satisfy a predefined threshold.

The manner in which the training engine 118 trains the machine learning model 106 on the training data 116 depends on the form of the machine learning model 106. In some cases, the training engine 118 may train the machine learning model 106 by determining an adjustment to the current values of the model parameters 108. In other cases, the training engine 118 may start by initializing the model parameters 108 to default values each time the machine learning model 106 is trained, e.g., values that are sampled from a predefined probability distribution, e.g., a standard Normal distribution.

Take, as an example, a case where the machine learning model 106 is a neural network model, and the training engine 118 trains the neural network model using one or more iterations of stochastic gradient descent. In this example, at each iteration, the training engine 118 selects a "batch" (set) of training examples from the training data 116, e.g., by randomly selecting a predefined number of training examples. The training engine 118 processes the image 102 from each selected training example using the machine learning model 106 in accordance with the current values of the model parameters 108, to generate a corresponding automatic segmentation. The training engine 118 determines gradients of an objective function with respect to the model parameters 108, where the objective function measures a similarity between: (i) the automatic segmentations generated by the machine learning model 106, and (ii) the edited segmentations specified by the training examples. The training engine 118 then uses the gradients of the objective function to adjust the current values of the model parameters 108 of the machine learning model 106. The objective function may be, e.g., a pixel-wise cross-entropy objective function, the training engine 118 may determine the gradients using backpropagation techniques, and the training engine 118 may adjust the current values of the model parameters 108 using any appropriate gradient descent technique, e.g., Adam or RMSprop.

Optionally, the training engine 118 may preferentially train the machine learning model 106 on training examples that were generated more recently, i.e., rather than treating each training example equally. For example, the training engine 118 may train the machine learning model 106 on training examples that are sampled from the training data 116, where training examples that were generated more recently have a higher likelihood of being sampled than older training examples. Preferentially training the machine learning model 106 on training examples that were generated more recently can enable the machine learning model 106 to focus on learning from newer training examples while maintaining the insights gained from older training examples.

Generally, the system 100 trains the machine learning model 106 to generate automatic segmentations 110 that match edited segmentations 114 specified by users of the system 100, e.g., pathologists. However, certain users may be more skilled than others in reviewing and editing automatic segmentations generated by the machine learning model 106 for accuracy. For example, a more experienced pathologist may achieve a higher accuracy in reviewing and editing segmentations of complex and ambiguous tissue samples than a more junior pathologist. In some implementations, each user of the system 100 may be associated with an "expertise" score that characterizes the predicted skill of the user in reviewing and editing segmentations. In these implementations, the machine learning model 106 may be trained using only edited segmentations that are generated by users with a sufficiently high expertise score, e.g., an expertise score that satisfies a predetermined threshold. An example process for determining an expertise score for a user is described in more detail with reference to FIG. 4.

Determining whether to train the machine learning model 106 on an edited segmentation based on the expertise score of the user that generated the segmentation can improve the performance of the machine learning model 106 by improving the quality of the training data. Optionally, users of the system 100 may be compensated (e.g., financially or otherwise) for providing segmentations that are used to train the machine learning model 106. In one example, the amount of compensation provided to a user may depend on the expertise score of the user, and users with higher expertise scores may receive more compensation than users with lower expertise scores.

Optionally, the system 100 may be a distributed system where various components of the system are implemented remotely from one another and communicate over a data communication network, e.g., the Internet. For example, the user interface 112 (including the display device) may be implemented in a clinical environment (e.g., a hospital), while the machine learning model 106 and the training engine 118 may be implemented in a remote data center.

Optionally, a user of the system 100 may be provided the option of disabling the machine learning model 106. If this option is selected, the user can load images 102 and manually segment them without use of the machine learning model 106.

Figure 2:
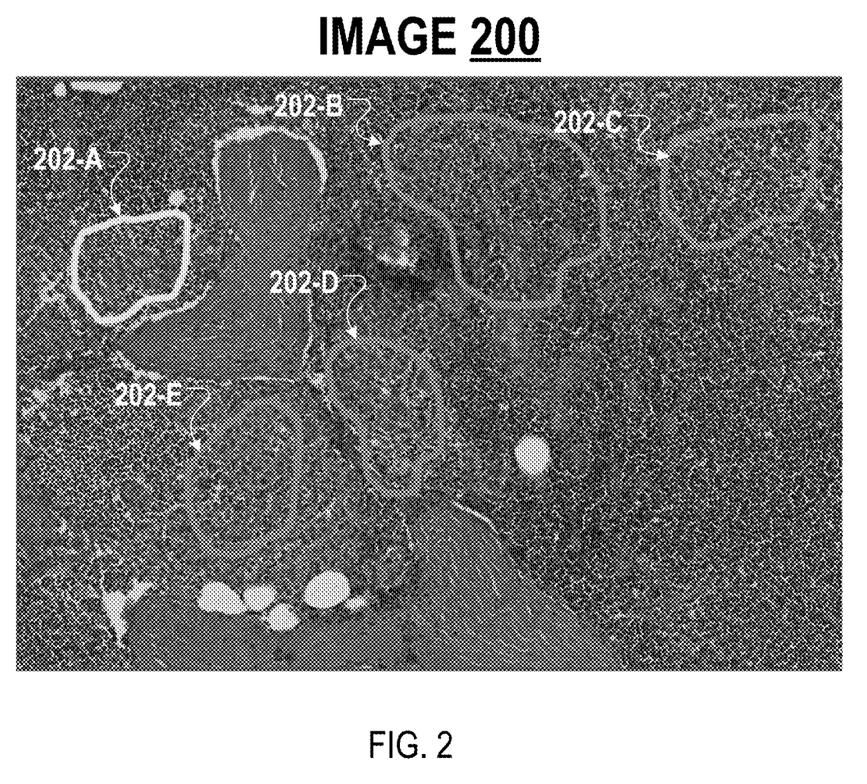
FIG. 2 is an illustration of an example segmentation of a magnified image of a tissue sample.

FIG. 2 is an illustration of a magnified image 200 of a tissue sample, where the regions 202-A-E (and the portion of the image outside of the regions 202-A-E) correspond to respective tissue classes.

Figure 3:
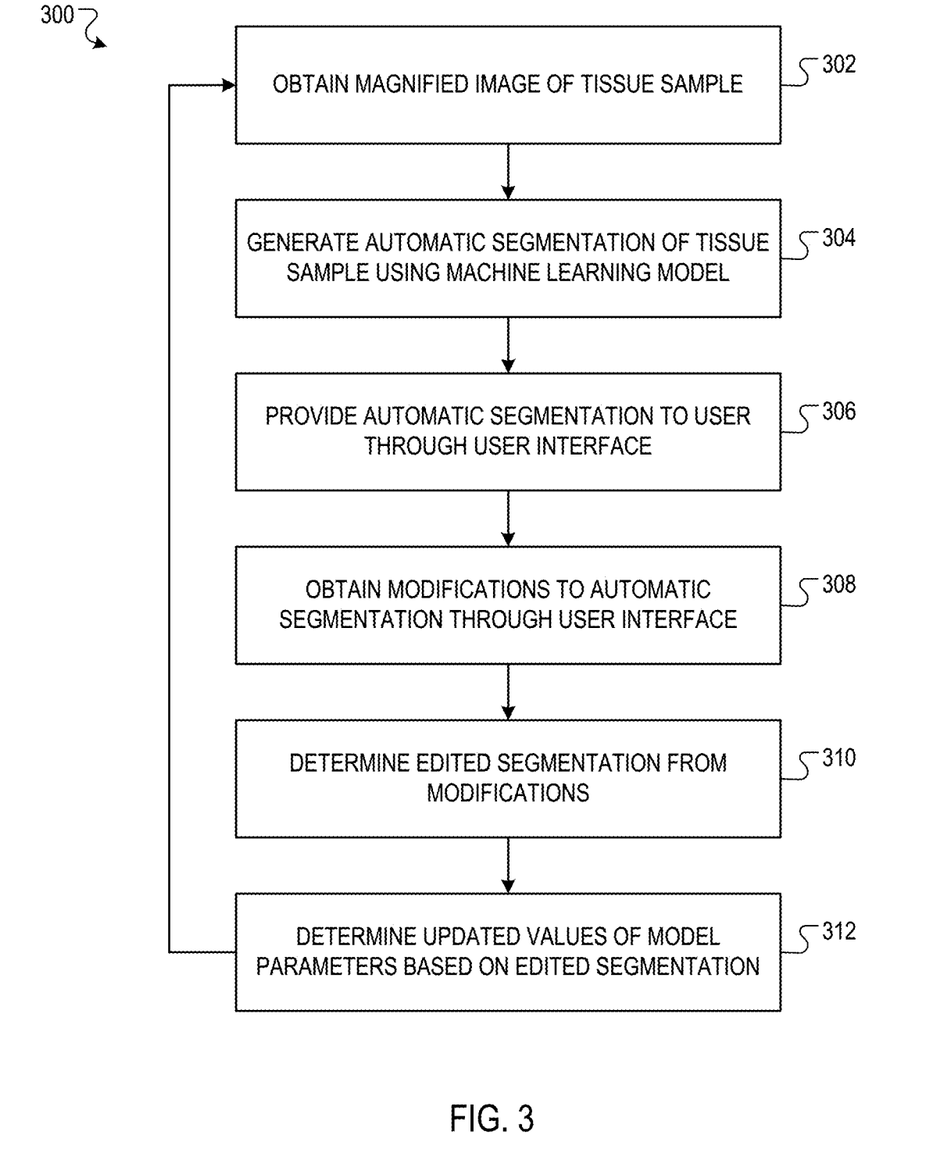
FIG. 3 is a flow diagram of an example process for repeatedly training a machine learning model to segment magnified images of tissue samples.

FIG. 3 is a flow diagram of an example process 300 for repeatedly training a machine learning model to segment magnified images of tissue samples. For convenience, the process 300 will be described as being performed by a system of one or more computers located in one or more locations. For example, a segmentation system, e.g., the segmentation system 100 of FIG. 1, appropriately programmed in accordance with this specification, can perform the process 300.

The system obtains a magnified image of a tissue sample (302). For example, the image may be a magnified whole slide image of a biopsy sample from a patient that is generated using a microscope.

The system processes an input including: (i) the image, (ii) features derived from the image, or (iii) both, in accordance with current values of the model parameters of the machine learning model to generate an automatic segmentation of the image into a set of (target) tissue classes (304). The automatic segmentation specifies a respective tissue class corresponding to each pixel of the image. The tissue classes may include cancerous tissue and non-cancerous tissue. The machine learning model may be a neural network model, e.g., a convolutional neural network model with one or more convolutional layers.

The system provides an indication of: (i) the image, and (ii) the automatic segmentation of the image, to the user through a user interface (306). For example, the system may provide a visualization that depicts the automatic segmentation overlaid on the image through a display device of the user interface. The visualization of the automatic segmentation overlaid on the image may indicate the predicted tissue type of each of the regions delineated by the automatic segmentation. For example, the visualization may indicate the predicted tissue type of a region by colorizing the region based on the tissue type, e.g., cancerous tissue is colored red, while non-cancerous tissue is colored green.

The system obtains an input specifying one or more modifications to the automatic segmentation of the image from the user through the user interface (308). Each modification to the automatic segmentation may indicate, for one or more pixels of the image, a change to the respective tissue class specified for the pixel by the automatic segmentation.

The system determines an edited segmentation of the image (310). For example, the system may determine the edited segmentation of the image by applying the modifications specified by the user through the user interface to the automatic segmentation of the image.

The system determines updated values of the model parameters of the machine learning model based on the edited segmentation of the image (312). For example, the system may determine gradients of an objective function that characterizes a similarity between: (i) the automatic segmentation of the image, and (ii) the edited segmentation of the image, and then adjust the values of the model parameters using the gradients. In some cases, the system may determine updated values of the model parameters of the machine learning model only in response to determining that a training criterion is satisfied, e.g., that a predefined number of new edited segmentations have been generated since the last time the model parameters were updated. After determining updated values of the model parameters, the system may return to step 302. If the training criterion is not satisfied, the system may return to step 302 without training the machine learning model.

Figure 4:
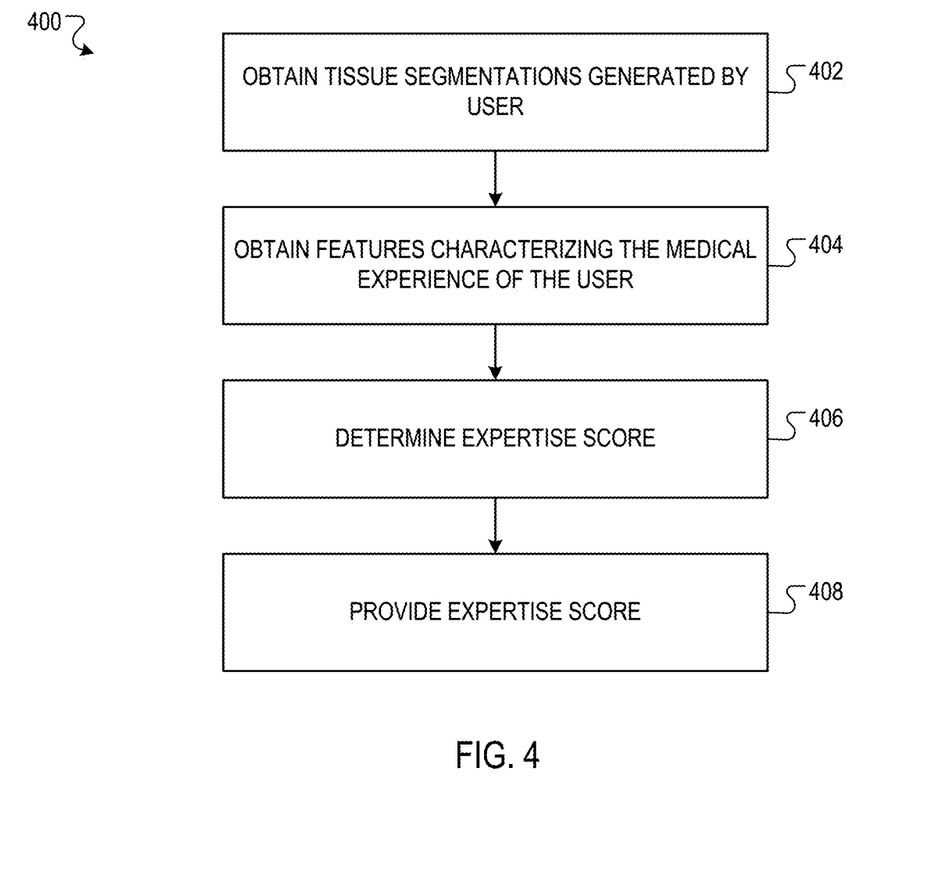
FIG. 4 is a flow diagram of an example process for determining an expertise score that characterizes the predicted skill of a user in reviewing and editing segmentations of target tissue classes in magnified images of tissue samples.

FIG. 4 is a flow diagram of an example process 400 for determining an expertise score that characterizes the predicted skill of a user in reviewing and editing segmentations of magnified images of tissue samples. For convenience, the process 400 will be described as being performed by a system of one or more computers located in one or more locations. For example, a segmentation system, e.g., the segmentation system 100 of FIG. 1, appropriately programmed in accordance with this specification, can perform the process 400.

The system obtains one or more tissue segmentations that were generated by the user (402). Each tissue segmentation corresponds to a magnified image of a tissue sample and specifies a respective tissue class for each pixel of the image. In some implementations, the user may have performed the segmentations from scratch, e.g., without the benefit of starting from automatic segmentations generated by a machine learning model.

The system obtains one or more features characterizing the medical experience of the user, e.g., in the field of pathology (404). For example, the system may obtain features characterizing one or more of: the number of years of experience of the user in the field of pathology, the number of academic publications of the user in the field of pathology, the number of citations of the academic publications of the user in the field of pathology, the academic performance of the user (e.g., in medical school), and the position currently held by the user (e.g., attending physician).

The system determines the expertise score for the user based on: (i) the tissue segmentations generated by the user, and (ii) the features characterizing the medical experience of the user (406). For example, the system may determine the expertise score as a function (e.g., a linear function) of: (i) a similarity measure between the segmentations generated by the user and corresponding "gold standard" segmentations of the same images, and (ii) the features characterizing the medical experience of the user. A gold standard segmentation of an image may be a segmentation that is generated by a user (e.g., a pathologist) that is recognized as having a high level of expertise in performing tissue segmentations. A similarity measure between two segmentations of an image can be evaluated using, e.g., a Jaccard index. The expertise score for a user may be represented as a numerical value, e.g., in the range [0,1].

The system provides the expertise score for the user (408). For example, the system may provide the expertise score for the user for use in determining whether segmentations generated by the user should be included in training data used to train a machine learning model to perform automatic tissue sample segmentations. In this example, segmentations generated by a user may be included in the training data only if, e.g., the expertise score for the user satisfies a threshold. In another example, the system may provide the expertise score for the user for use in determining how the user should be compensated (e.g., financially or otherwise) for providing tissue sample segmentations, e.g., where having a higher expertise score may result in higher compensation.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor (e.g., central processing unit (CPU), graphics processing unit (GPU)), a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. One or more non-transitory computer storage media storing instructions that when executed by one or more computers cause the one or more computers to perform operations for training a machine learning model to segment magnified images of tissue samples, wherein the operations comprise:
   determining an expertise score of a user that characterizes a predicted skill of the user in segmenting magnified images of tissue samples, comprising:
      obtaining one or more manual segmentations, generated by the user, of magnified images of tissue samples; and
      determining the expertise score of the user based at least in part on the manual segmentations generated by the user;
   in response to determining that the expertise score of the user satisfies a threshold, repeatedly performing operations comprising:
      obtaining a magnified image of a tissue sample;
      processing an input comprising: the image, features derived from the image, or both, in accordance with current values of model parameters of a machine learning model to generate an automatic segmentation of the image into a plurality of tissue classes, wherein the automatic segmentation specifies a respective tissue class corresponding to each pixel of the image;
      providing, to the user through a user interface, an indication of: (i) the image, and (ii) the automatic segmentation of the image;
      obtaining, from the user through the user interface, an input specifying one or more modifications to the automatic segmentation of the image;
      determining an edited segmentation of the image, comprising applying the modifications specified by the user to the automatic segmentation of the image; and
      determining updated values of the model parameters of the machine learning model based the edited segmentation of the image.

2. The non-transitory computer storage media of claim 1, wherein determining the expertise score of the user based at least in part on the manual segmentations generated by the user comprises:
   determining the expertise score for the user based at least in part on, for each of the one or more manual segmentations generated by the user, a respective similarity measure between: (i) the manual segmentation, and (ii) a gold standard segmentation.

3. The non-transitory computer storage media of claim 2, wherein for each of the one or more manual segmentations generated by the user, the similarity measure is based on a Jaccard index.

4. The non-transitory computer storage media of claim 1, wherein the operations further comprise:
   obtaining a set of features characterizing a medical experience of the user; and
   determining the expertise score of the user based on both:
      (i) the manual segmentations generated by the user, and
      (ii) the set of features characterizing the medical experience of the user.

5. The non-transitory computer storage media of claim 4, wherein the set of features characterizing the medical experience of the user comprises a feature characterizing a number of years of medical experience of the user.

6. The non-transitory computer storage media of claim 4, wherein the set of features characterizing the medical experience of the user comprises a feature characterizing a number of publications of the user.

7. The non-transitory computer storage media of claim 6, wherein the set of features characterizing the medical experience of the user comprises a feature characterizing a number of citations of the publications of the user.

8. The non-transitory computer storage media of claim 4, wherein determining the expertise score of the user based on both: (i) the manual segmentations generated by the user, and (ii) the set of features characterizing the medical experience of the user, comprises:
   determining the expertise score of the user based on a linear combination of: (i) a first score based on the manual segmentations generated by the user, and (ii) a second score based on the set of features characterizing the medical experience of the user.

9. The non-transitory computer storage media of claim 1, wherein the plurality of tissue classes comprise cancerous tissue and non-cancerous tissue.

10. The non-transitory computer storage media of claim 1, wherein the image is a whole slide image (WSI) captured using a microscope.

11. The non-transitory computer storage media of claim 1, wherein providing, to the user through the user interface, an indication of: (i) the image, and (ii) the automatic segmentation of the image comprises:
   providing, to the user through the user interface, a visualization that depicts the automatic segmentation overlaid on the image.

12. The non-transitory computer storage media of claim 11, wherein the visualization that depicts the automatic segmentation overlaid on the image indicates the respective tissue class corresponding to each pixel of the image.

13. The non-transitory computer storage media of claim 1, wherein:
   each modification to the automatic segmentation of the image indicates, for one or more pixels of the image, a change to the respective tissue class specified for the pixel by the automatic segmentation; and
   applying the modifications specified by the user to the automatic segmentation of the image comprises changing the tissue classes corresponding to one or more pixels of the image in accordance with the modifications specified by the user.

14. The non-transitory computer storage media of claim 1, wherein determining updated values of the model parameters based on the edited segmentation of the image comprises:
   determining gradients of an objective function that characterizes a similarity between: (i) the automatic segmentation of the image, and (ii) the edited segmentation of the image; and
   adjusting the values of the model parameters using the gradients.

15. A system comprising:
one or more computers; and
one or more storage devices communicatively coupled to the one or more computers, wherein the one or more storage devices store instructions that, when executed by the one or more computers, cause the one or more computers to perform operations for training a machine learning model to segment magnified images of tissue samples, wherein the operations comprise:
determining an expertise score of a user that characterizes a predicted skill of the user in segmenting magnified images of tissue samples, comprising:
obtaining one or more manual segmentations, generated by the user, of magnified images of tissue samples; and
determining the expertise score of the user based at least in part on the manual segmentations generated by the user;
in response to determining that the expertise score of the user satisfies a threshold, repeatedly performing operations comprising:
obtaining a magnified image of a tissue sample;
processing an input comprising: the image, features derived from the image, or both, in accordance with current values of model parameters of a machine learning model to generate an automatic segmentation of the image into a plurality of tissue classes, wherein the automatic segmentation specifies a respective tissue class corresponding to each pixel of the image;
providing, to the user through a user interface, an indication of: (i) the image, and (ii) the automatic segmentation of the image;
obtaining, from the user through the user interface, an input specifying one or more modifications to the automatic segmentation of the image;
determining an edited segmentation of the image, comprising applying the modifications specified by the user to the automatic segmentation of the image; and
determining updated values of the model parameters of the machine learning model based the edited segmentation of the image.

16. A method performed by one or more computers for training a machine learning model to segment magnified images of tissue samples, the method comprising:
determining an expertise score of a user that characterizes a predicted skill of the user in segmenting magnified images of tissue samples, comprising:
obtaining one or more manual segmentations, generated by the user, of magnified images of tissue samples; and
determining the expertise score of the user based at least in part on the manual segmentations generated by the user;
in response to determining that the expertise score of the user satisfies a threshold, repeatedly performing operations comprising:
obtaining a magnified image of a tissue sample;
processing an input comprising: the image, features derived from the image, or both, in accordance with current values of model parameters of a machine learning model to generate an automatic segmentation of the image into a plurality of tissue classes, wherein the automatic segmentation specifies a respective tissue class corresponding to each pixel of the image;
providing, to the user through a user interface, an indication of: (i) the image, and (ii) the automatic segmentation of the image;
obtaining, from the user through the user interface, an input specifying one or more modifications to the automatic segmentation of the image;
determining an edited segmentation of the image, comprising applying the modifications specified by the user to the automatic segmentation of the image; and
determining updated values of the model parameters of the machine learning model based the edited segmentation of the image.

17. The method of claim 16, wherein determining the expertise score of the user based at least in part on the manual segmentations generated by the user comprises:
determining the expertise score for the user based at least in part on, for each of the one or more manual segmentations generated by the user, a respective similarity measure between: (i) the manual segmentation, and (ii) a gold standard segmentation.

18. The method of claim 17, wherein for each of the one or more manual segmentations generated by the user, the similarity measure is based on a Jaccard index.

19. The method of claim 16, further comprising:
obtaining a set of features characterizing a medical experience of the user; and
determining the expertise score of the user based on both: (i) the manual segmentations generated by the user, and (ii) the set of features characterizing the medical experience of the user.

20. The method of claim 19, wherein the set of features characterizing the medical experience of the user comprises a feature characterizing a number of years of medical experience of the user.

* * * * *